3,188,322
DIHYDRODIBENZOTHIAZEPINES
Harry L. Yale, New Brunswick, Francis A. Sowinski, Edison, and Jack Bernstein, New Brunswick, N.J., assignors to Olin Mathieson Chemical Corporation, New York, N.Y., a corporation of Virginia
No Drawing. Filed Aug. 8, 1962, Ser. No. 215,547
The portion of the term of the patent subsequent to Dec. 18, 1979, has been disclaimed and dedicated to the Public
8 Claims. (Cl. 260—327)

This invention relates to new basically substituted dihydrodibenzothiazepines (and their salts) having valuable therapeutic properties, processes for the preparation thereof, and new intermediates useful in such processes.

The therapeutically active compounds of this invention include dihydrodibenzothiazepines of the general Formula

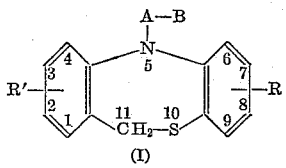

(I)

I; wherein A is a lower alkylene radical of at least two carbon atoms, B is a basic saturated nitrogen-containing radical of less than twelve carbon atoms, and R and R' are the same or different and represent hydrogen, halogen, lower alkyl, lower alkoxy, trifluoromethyl, trifluoromethylmercapto, trifluoromethoxy or dimethylaminosulfonyl. Among the suitable radicals represented by the symbol B are: amino; (lower alkyl)amino; di(lower alkyl)amino; di(hydroxy-lower alkyl)amino; and basic saturated 5 to 7 membered N-heterocyclic radicals of less than twelve carbon atoms, as exemplified by piperidyl [i.e., piperidino, 2-piperidyl, 3-piperidyl and 4-piperidyl]; (lower alkyl)-piperidyl [e.g., 2,3- or 4-(lower alkyl)piperidino or 2,3- or 4-(N-lower alkyl)piperidyl]; di(lower alkyl)piperidyl [e.g., 2,4-, 2,5- or 3,5-di(lower alkyl)piperidino, or 2,3- or 4-(lower alkyl)-(N-lower alkyl)piperidyl]; (lower alkoxy)piperidyl; homopiperidino; pyrrolidyl; (lower alkyl)pyrrolidyl; di(lower alkyl)pyrrolidyl; (lower alkoxy)-pyrrolidyl; morpholinyl [i.e., morpholino, 2-morpholinyl and 3-morpholinyl]; (lower alkyl) morpholinyl; di(lower alkyl)morpholinyl; (lower alkoxy)morpholinyl; thiamorpholinyl; (lower alkyl)thiamorpholinyl; di(lower alkyl) thiamorpholinyl; (lower alkoxy)thiamorpholinyl; piperazyl; (lower alkyl)piperazyl (e.g., $N^4$-methylpiperazino); di(lower alkyl)piperazyl; (lower alkoxy)piperazyl; (hydroxy-lower alkyl)piperazyl [e.g., $N^4$-(2-hydroxyethyl) piperazino]; (lower alkanoyloxyalkyl)piperazyl [e.g., $N^4$ - (2 - acetoxyethyl)piperazino]; (hydroxy-lower alkoxy-lower alkyl)piperazyl [e.g., $N^4$-(2-hydroxyethoxyethyl)piperazino]; (carbo-lower alkoxy)piperazyl [e.g., $N^4$-(2-carbomethoxy, carboethoxy, or carbopropoxy)-piperazino]; and homopiperazino. The terms "lower alkyl," "lower alkoxy," and "lower alkylene," as employed herein, include both straight and branched chain radicals of less than eight carbon atoms. The particularly preferred compounds are those wherein A is a lower alkylene radical of two to three carbon atoms (i.e., ethylene, trimethylene-1,3 and propylene-1,2); B represents a di(lower alkyl)amino radical, an $N^4$-(lower alkyl)piperazino radical, an $N^4$-(2-hydroxyethyl)piperazino radical, or an $N^4$-(2-acetoxyethyl)piperazino radical, and R and R' are hydrogen.

As to salts of the dihydrodibezothiazepines, those coming within the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

The compounds of this invention are therapeutically active compounds which are utilizable both as ataractic agents, and thus may be used in the treatment of depressed psychotic states, and as antihistamines. For these purposes they may be administered orally or parenterally in conventional dosage forms such as tablets, capsules, injectables or the like by incorporating the appropriate dose of the compound with carriers according to accepted pharmaceutical practice.

The compounds of this invention are prepared by a series of reactions as shown by the following equations, wherein R, R', A and B are as hereinbefore defined; and X' is chloro or bromo:

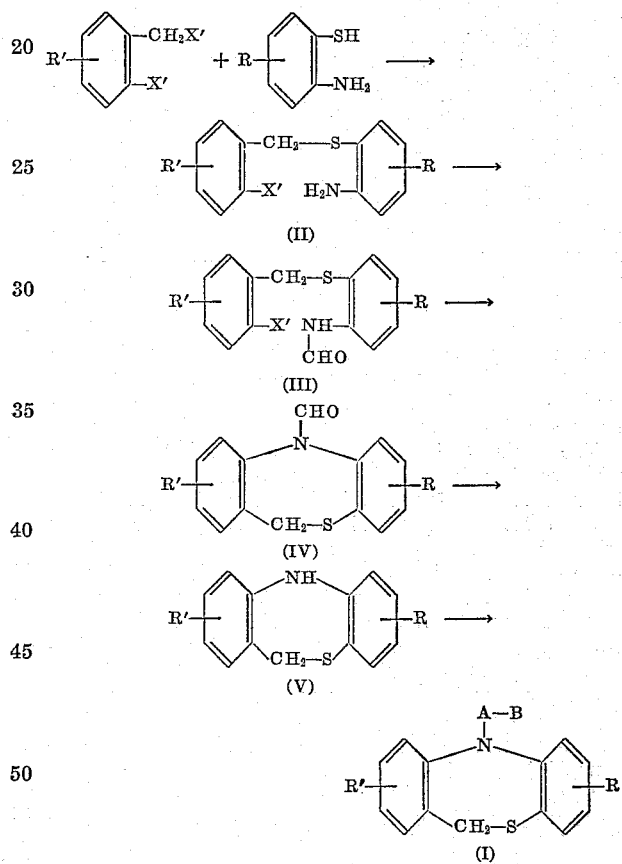

Among the suitable o-halobenzyl halides utilizable as initial reagents in these reactions may be mentioned: o-halobenzyl halides, such as o-bromobenzyl bromide, o-chlorobenzyl chloride and o-bromobenzyl chloride; halo-o-halobenzyl halides, such as 2,5-dibromobenzyl bromide, 2,4-dibromobenzyl bromide, 2-bromo-5-fluorobenzyl chloride, 2-bromo-5-chlorobenzyl chloride, and 2-bromo-4-fluorobenzyl chloride; (lower alkyl)-o-halobenzyl halides, such as 5-(lower alkyl)-2-halobenzyl halides, (e.g., 5-methyl-2-bromobenzyl chloride, 5-ethyl - 2 - bromobenzyl bromide, 5-n-propyl-2-bromobenzyl bromide and 5-n-hexyl-2-chlorobenzyl chloride) and 4-(lower alkyl)-2-halobenzyl halides; (lower alkoxy)-o-halobenzyl halides, such as 5-(lower alkoxy)-2-halobenzyl halides (e.g., 5-methoxy-2-bromobenzyl bromide, 5-ethoxy-2-bromobenzyl chloride, 5-n-propoxy-2-bromobenzyl chloride and 5-n-hexyloxy-2-chlorobenzyl chloride); (trifluoromethyl)-o-halobenzyl halides, such as 5-(trifluoromethyl)-2-bromobenzyl chloride and 4-(trifluoromethyl)-2-bromobenzyl bromide; (trifluoromethylmercapto)-o-halobenzyl halides, such as 5-(trifluoromethylmercapto)-2-bromobenzyl chloride and 4 - (trifluoromethylmercapto) - 2 - bromobenzyl bromide; (trifluoromethoxy)-o-halobenzyl halides, such as 5-(trifluoromethoxy)-2-bromobenzyl chloride and 4-(trifluoromethoxy-2-bromobenzyl bromide; and (dimethylaminosulfonyl)-o-halobenzyl halides, such as 5-(dimethylaminosulfonyl)-2-bromobenzyl chloride and 4-(dimethylaminosulfonyl)-2-bromobenzyl bromide.

Among the suitable o-aminobenzenethiols utilizable as initial reagents in these reactions may be mentioned: o-aminobenzenethiol; halo-o-aminobenzenethiols, such as 5-chloro-2 - aminobenzenethiol, 4-chloro-2-aminobenzenethiol, 5-fluoro-2-aminobenzenethiol, 4-fluoro-2-aminobenzenethiol and 5-bromo - 2 - aminobenzenethiol; (lower alkyl)-o-aminobenzenethiols, such as 5-(lower alkyl)-2-aminobenzenethiols (e.g., 5-methyl-2-aminobenzenethiol, 5 - ethyl-2-aminobenzenthiol, 5-n-propyl-2-aminobenzenethiol and 5-n-hexyl-2-aminobenzenethiol) and 4-(lower alkyl)-2-aminobenzenethiols; (lower alkoxy)-o-aminobenzenethiols, such as 5-(lower alkoxy)-o-aminobenzenethiols (e.g., 5-methoxy-2-aminobenzenethiol, 5-ethoxy-2-aminobenzenethiol, 5-n-propoxy-2-aminobenzenethiol and 5-n-hexyloxy-2-aminobenzenethiol) and 4-(lower alkoxy)-2-aminobenzenethiols); (trifluoromethyl) - o - aminobenzenethiols, such as 5-(trifluoromethyl)-2-aminobenzenethiol and 4-(trifluoromethyl)-2-aminobenzenethiol; trifluoromethoxy-o-aminobenzenethiols, such as 5-trifluoromethoxy-2-aminobenzenethiol; trifluoromethylmercapto-o-aminobenzenethiols, such as 5-trifluoromethylmercapto-2-aminobenzenethiol; and N,N-dimethylaminosulfonyl - o-aminobenzenethiols.

In the initial reaction of the process of this invention the o-halobenzyl halide is reacted with an o-aminobenzenethiol, the reaction preferably being conducted in the presence of a condensation agent, such as a base (e.g., sodium hydroxide), whereby a corresponding o-halobenzyl-o-aminophenylthioether (Compound II) is formed. The aniline derivative (Compound II) is then treated with formic acid whereby the corresponding 2-(o-halobenzylmercapto) formanilide derivative (Compound III) is produced. Compound III is then cyclized by treatment with a basic reagent (e.g., potassium carbonate and sodium carbonate) in a solvent (e.g., N,N-dimethylformamide, N,N-dimethylacetamide and nitrobenzene) at an elevated temperature, whereby the corresponding 5-formyl-5,11-dihydrodibenzo [b, e] [1,4]thiazepine derivative (Compound IV) is formed. The formamide is then hydrolyzed, as by treatment with a base (e.g., sodium hydroxide) at an elevated temperature to yield the 5,11-dihydrodibenzo [b,e] [1,4]thiazepine derivative (Compound V).

Compound V is then treated with a basically substituted alkyl halide of the formula: B—A halide, wherein B and A are as hereinbefore defined, the reaction preferably being conducted in the presence of a basic condensation reagent such as sodium hydride to yield the final products of this invention (Compound I). The same compounds can alternatively be prepared in two steps, by first reacting with an alkylene dihalide of the formula: (halide)—A—(halide) and then with a base of the formula: BH. To prepare the acid-addition salts, the resulting base is treated with the desired acid in the usual manner.

The following examples illustrate the invention (all temperatures being in centigrade). The first eight examples are directed to the preparation of the 10-unsubstituted intermediates and the remaining examples are directed to the preparation of the final compounds of this invention.

EXAMPLE 1

*5,11-dihydrodibenzo [b,e] [1,4]thiazepine*

(a) *Preparation of 2 - (o-bromobenzylmercapto)aniline.*—To a stirred solution of 119.5 g. of o-bromobenzyl bromide and 62.5 g. of o-aminobenzenethiol in 400 ml. of 95% ethanol, thoroughly purged with nitrogen, is added dropwise a solution of 39.6 g. of 85% potassium hydroxide in 200 ml. of water and the reaction mixture subsequently refluxed for two hours. The mixture is then concentrated to dryness. The residue is dissolved in one liter of ether, washed well with water, and the ether solution concentrated to give 2-(o-bromobenzylmercapto)aniline.

(b) *Preparation of 2 - (o-bromobenzylmercapto)formanilide.*—To a mixture of 169 g. of 98–100% formic acid and 73.5 g. of acetic anhydride is added slowly 147 g. of 2 - (o-bromobenzylmercapto)aniline. Subsequently, the mixture is refluxed one-half hour and concentrated to dryness to give 2-(o-bromobenzylmercapto) formanilide.

(c) *Preparation of 5,11-dihydrodibenzo[b,e][1,4]thiazepine-5-carboxaldehyde.*—A stirred mixture of 64.4 g. of 2-(o-bromobenzylmercapto)-formanilide, 28 g. of anhydrous potassium carbonate, 5 g. of copper powder, and 500 ml. of dimethylformamide is heated under nitrogen in an oil bath maintained at 155–160° for four hours. The reaction mixture is then filtered hot, and the filtrate concentrated to dryness. The residue is extracted repeatedly with boiling petroleum ether, the petroleum ether extracts are decolorized with Darco, filtered and concentrated to give the product.

(d) *Preparation of 5,11 - dihydrodibenzo[b,e] [1,4]thiazepine.*—10 g. of 5,11 - dihydrodibenzo[b,e][1,4]thiazepine-5-carboxaldehyde is dissolved in a mixture of 100 ml. of 95% ethyl alcohol and 20 ml. of 10% aqueous sodium hydroxide. The solution is refluxed for one hour, cooled, neutralized and concentrated to dryness. The residue is extracted with boiling petroleum ether and the petroleum ether extracts decolorized with Darco and concentrated to give the product.

EXAMPLE 2

*3-chloro-5,11-dihydrodibenzo[b,e] [1,4]thiazepine*

Following the procedure of Example 1, but substituting an equivalent amount of 2-bromo-4-chlorobenzyl bromide (prepared from 2-bromo-4-chlorotoluene and N-bromosuccinimide) for the o-bromobenzyl bromide in step a, 3-chloro-5,11-dihydrodibenzo[b,e][1,4]thiazepine is obtained.

EXAMPLE 3

*3-(trifluoromethyl)-5,11-dihydrodibenzo [b,e] [1,4]thiazepine*

Following the procedure of Example 1, but substituting an equivalent amount of 2-bromo-4-(trifluoromethyl)benzyl bromide for the o-bromobenzyl bromide in step a, 3-(trifluoromethyl)-5,11-dihydrodibenzo[b,e] [1,4]thiazepine is obtained.

EXAMPLE 4

*7-methyl-5,11-dihydrodibenzo[b,e] [1,4]thiazepine*

Following the procedure of Example 1, but substituting an equivalent amount of 2-amino-4-methylbenzenethiol (prepared from p-chloro- or -nitrotoluene and $Na_2S_2$, followed by reduction of the disulfide formed for the o-aminobenzenethiol in step a, 7-methyl-5,11-dihydrodibenzo[b,e] [1,4]oxazepine is obtained.

EXAMPLE 5

*3,7-dichloro-5,11-dihydrodibenzo[b,e] [1,4]thiazepine*

Following the procedure of Example 1, but substituting an equivalent amount of 2-bromo-4-chlorobenzyl bromide for the o-bromobenzyl bromide and an equivalent amount of 2-amino-4-chlorobenzenethiol for the o-aminobenzenethiol in step *a*, 3,7 - dichloro-5,11-dihydrodibenzo[b,e][1,4]thiazepine is obtained.

EXAMPLE 6

*7-chloro-5,11-dihydrodibenzo[b,e][1,4]thiazepine*

By substituting in Example 1, step *a*, an equivalent amount of o-amino-p-chlorobenezenethiol for the o-aminobenzenethiol and then proceeding through steps *b*, *c* and *d*, there is obtained 7-chloro-5,11-dihydrodibenzo[b,e][1,4]thiazepine.

EXAMPLE 7

*7-(trifluoromethyl)-5,11-dihydrodibenzo[b,e][1,4]thiazepine*

By substituting in Example 1, step *a*, an equivalent amount of p-(trifluoromethyl)-o-aminobenzenethiol for the o-aminobenzenethiol and then proceeding through steps *b*, *c* and *d*, there is obtained 7-(trifluoromethyl)-5,11-dihydrodibenzo[b,e][1,4]thiazepine.

EXAMPLE 8

*7-ethoxy-5,11-dihydrodibenzo[b,e][1,4]thiazepine*

By substituting in Example 1, step *a*, an equivalent amount of p-ethoxy-o-aminobenzenethiol (prepared from p-chloro-m-nitrophenetole and $Na_2S_2$ followed by reduction of the disulfide formed) and then proceeding through steps *b*, *c* and *d*, there is obtained 7-ethoxy-5,11-dihydrodibenzo[b,e][1,4]thiazepine.

Similarly, if 3-bromo-4-chloromethyl-N,N-dimethylbenzenesulfonamide (prepared by the raction of p-bromo-N,N-dimethylamide with formaldehyde and hydrochloric acid), 3 - bromo-4-chloromethyl-(trifluoromethoxy)benzene [prepared by the light catalyzed chlorination of m-bromoanisole to m-bromo-(trichloromethoxy)benzene, followed by reaction with antimony trifluoride to convert the (trichloromethoxy) group to a (trifluoromethoxy) group and treatment of the m-bromo-(trifluoromethoxy)-benzene with formaldehyde and hydrochloric acid], and 3 - bromo-4-chloromethyl-(trifluoromethylmercapto)benzene [prepared by the light catalyzed chlorination of m-bromothioanisole to m-bromo-(trichloromethylmercapto)benzene, followed by reaction with antimony trifluoride to convert the (trichloromethylmercapto) group to a (trifluoromethylmercapto) group and treatment of the m-bromo-(trifluoromethylmercapto)benzene with formaldehyde and hydrochloric acid] are substituted for the o-bromobenzyl bromide in step *a* of Example 1, there are obtained 3 - (N,N - dimethylaminosulfonyl) - 5,11-dihydrodibenzo[b,e][1,4]thiazepine, 3-(trifluoromethoxy)-5,11-dihydrodibenzo[b,e][1,4]thiazepine, and 3-(trifluoromethylmercapto)-5,11-dihydrodibenzo[b,e][1,4]thiazepine, respectively.

Similarly, if other substituted o-bromo(or chloro)-benzyl bromides (or chlorides) are substituted for the o-bromobenzyl bromide and other substituted o-aminobenzenethiols are substituted for the o-aminobenzenethiol in step *a* of Example 1, and the remaining steps of the example are carried out, correspondingly substituted 5,11-dihydrodibenzo[b,e][1,4]thiazepines are prepared.

EXAMPLE 9

*5-(3-dimethylaminopropyl)-5,11-dihydrodibenzo[b,e][1,4]thiazepine*

A stirred mixture of 8.58 g. of 5,11-dihydrodibenzo[b,e][1,4]thiazepine, 2.3 g. of a 50% sodium hydride dispersion in mineral oil, and 200 ml. of tetrahydrofuran is stirred for two hours at room temperature and 7.3 g. of 3-dimethylaminopropyl chloride is added. The mixture is heated under reflux for three hours, a second portion of 3.5 g. of the sodium hydroxide and 4.5 g. of 3-dimethylaminopropyl chloride added and the reflux is continued for an additional three hours. The reaction mixture is then worked up to give 5-(3-dimethylaminopropyl)-5,11-dihydrodibenzo[b,e][1,4]thiazepine.

EXAMPLE 10

*5-(3-dimethylaminopropyl)-5,11-dihydrodibenzo[b,e][1,4]thiazepine hydrochloride*

To 2.92 g. of 5-(3-dimethylaminopropyl)-5,11-dihydrodibenzo[b,e][1,4]thiazepine in 30 ml. of dry ether is added dropwise, with ice cooling, a solution of 0.37 g. of dry hydrogen chloride in 10 ml. of dry ether. The precipitate which forms is allowed to granulate and then filtered and dried to give 5-(3-dimethylaminopropyl)-5,11-dihydrodibenzo[b,e][1,4]thiazepine hydrochloride.

EXAMPLE 11

*5-(3-dimethylaminopropyl)-3-chloro-5,11-dihydrobenzo[b,e][1,4]thiazepine*

Following the procedure of Example 9, but substituting an equivalent amount of 3-chloro-5,11-dihydrodibenzo[b,e][1,4]thiazepine for the 5,11-dihydrodibenzo[b,e][1,4]thiazepine, 5 - (3-dimethylaminopropyl)-3-chloro-5,11-dihydrobenzo[b,e][1,4]thiazepine is obtained.

EXAMPLE 12

*5-(3-dimethylaminopropyl)-3-(trifluoromethyl)-5,11-dihydrodibenzo[b,e][1,4]thiazepine*

Following the procedure of Example 9, but substituting an equivalent amount of 3-(trifluoromethyl)-5,11-dihydrodibenzo[b,e][1,4]thiazepine for the 5,11-dihydrodibenzo[b,e][1,4]thiazepine, 5-(3-dimethylaminopropyl)-3-(trifluoromethyl) - 5,11 - dihydrodibenzo[b,e][1,4]thiazepine is obtained.

Similarly, 3 - (trifluoromethoxy)-5,11-dihydrodibenzo[b,e][1,4]thiazepine, 3-(trifluoromethylmercapto)-5,11-dihydrodibenzo[b,e][1,4]thiazepine and 3-(N,N-dimethylsulfonamido) - 5,11-dihydrodibenzo[b,e][1,4]thiazepine yield the corresponding 5-(3-dimethylaminopropyl)derivatives.

EXAMPLE 13

*5-(3-dimethylaminopropyl)-7-methyl-5,11-dihydrodibenzo[b,e][1,4]thiazepine*

Following the procedure of Example 9, but substituting an equivalent amount of 7-methyl-5,11-dihydrodibenzo[b,e][1,4]thiazepine for the 5,11-dihydrodibenzo[b,e][1,4]thiazepine, 5 - (3-dimethylaminopropyl)-7-methyl-5,11-dihydrodibenzo[b,e][1,4]thiazepine is obtained.

EXAMPLE 14

*5-(3-dimethylaminopropyl)-3,7-dichloro-5,11-dihydrodibenzo[b,e][1,4]thiazepine*

Following the procedure of Example 9, but substituting an equivalent amount of 3,7-dichloro-5,11-dihydrodibenzo[b,e][1,4]thiazepine for the 5,11-dihydrodibenzo[b,e][1,4]thiazepine, 5-(3-dimethylaminopropyl)-3,7-dichloro-5,11-dihydrodibenzo[b,e][1,4]thiazepine is obtained.

EXAMPLE 15

*5-(2-dimethylaminoethyl)-5,11-dihydrodibenzo[b,e][1,4]thiazepine*

Following the procedure of Example 9, but substituting an equivalent amount of 2-dimethylaminoethyl chloride for the 3-dimethylaminopropyl chloride, 5-(2-dimethylaminoethyl) - 5,11-dihydrodibenzo[b,e][1,4]thiazepine is obtained.

EXAMPLE 16

*5-[3-(N⁴-methylpiperazino)propyl]-5,11-dihydrodibenzo[b,e][1,4]thiazepine*

Following the procedure of Example 9, but substituting an equivalent amount of 3-(N⁴-methylpiperazino)propyl chloride for the 3-dimethylaminopropyl chloride, 5-[3-

($N^4$ - methylpiperazino)propyl] - 5,11 - dihydrodibenzo-[b,e][1,4]thiazepine is obtained.

EXAMPLE 17

5-{3-[$N^4$-(2-hydroxyethyl)piperazino]propyl}-5,11-dihydrodibenzo[b,e][1,4]thiazepine (a) *Preparation of 5-(3-chloropropyl)-5,11-dihydrodibenzo[b,e][1,4]thiazepine*.—Following the procedure of Example 9, but substituting an equivalent amount of trimethylene chlorobromide for the 3-dimethylaminopropyl chloride, there is obtained 5-(3-chloropropyl)-5,11-dihydrodibenzo[b,e][1,4]thiazepine.

(b) *Preparation of 5-{3-[$N^4$-(2-hydroxyethyl)piperazino]propyl} - 5,11 - dihydrodibenzo[b,e][1,4]thiazepine*.—To 4.55 g. of 5-(3-chloropropyl)-5,11-dihydrodibenzo[b,e][1,4]thiazepine in 100 ml. of methyl ethyl ketone is added 15 g. of sodium iodide and 23.2 g. of 1-(2-hydroxyethyl)-piperazine. The mixture is stirred and refluxed for eighteen hours and concentrated from the steam bath. The residue is diluted with water and extracted with ether. The ether extracts are concentrated to give 5 - {3 - [$N^4$-(2 - hydroxyethyl)piperazino]propyl} - 5,11-dihydrodibenzo[b,e][1,4]thiazepine.

By substituting an equivalent amount of 1-(2-hydroxyethoxy-ethyl)piperazine or 1-(2-acetoxyethyl)piperazine for the 1-(2-hydroxyethyl)piperazine in step *b* of Example 17, there is obtained 5-{3-[$N^4$-(2-hydroxyethoxyethyl)-piperazino]propyl} - 5,11 - dihydrodizenzo[b,e][1,4]thiazepine and 5-{3 - [$N^4$(2-acetoxyethyl)piperazino]propyl} - 5,11 - dihydrodibenzo[b,e][1,4]thiazepine, respectively.

EXAMPLE 18

5-(3-dimethylaminopropyl)-7-chloro-5,11-dihydrodibenzo[b,e][1,4]thiazepine

By substituting for the 5,11-dihydrodibenzo[b,e][1,4]-thiazepine in Example 9, 9.94 g. of 7-chloro-5,11-dihydrodibenzo[b,e][1,4]thiazepine, there is obtained 5-(3-dimethylaminopropyl) - 7 - chloro - 5,11 - dihydrodibenzo-[b,e,][1,4]thiazepine.

EXAMPLE 19

5-(3-dimethylaminopropyl)-7-(trifluoromethyl)-5,11-dihydrodibenzo[b,e][1,4]thiazepine Following the procedure of Example 9 but substituting an equivalent amount of 7-(trifluoromethyl)-5,11-dihydrodibenzo[b,e][1,4]thiazepine for the 5,11-dihydrodibenzo[b,e][1,4]thiazepine, there is obtained 5-(3-dimethylaminopropyl) - 7 - (trifluoromethyl)-5,11-dihydrodibenzo[b,e][1,4]thiazepine.

EXAMPLE 20

5-(3-dimethylaminopropyl)-7-ethoxy-5,11-dihydrodibenzo[b,e][1,4]thiazepine

Following the procedure of Example 9 but substituting an equivalent amount of 7-ethoxy-5,11-dihydrodibenzo-[b,e][1,4]thiazepine for the 5,11-dihydrodibenzo[b,e]-[1,4]thiazepine, there is obtained 5-(3-dimethylaminopropyl) - 7 - ethoxy - 5,11-dihydrodibenzo[b,e][1,4]thiazepine.

This invention may be variously otherwise embodied within the scope of the appended claims.

What is claimed is:

1. A compound selected from the group consisting of bases of the formula

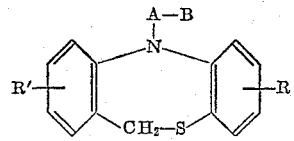

wherein A is lower alkylene of two to eight carbon atoms; B is a basic saturated nitrogen-containing radical of less than twelve carbon atoms selected from the group consisting of amino, (lower alkyl)amino, di(lower alkyl)amino, di(hydroxy-lower alkyl) amino, piperidyl, (lower alkyl)piperidyl, di(lower alkyl)piperidyl, (lower alkoxy)-piperidyl, homopiperidino, pyrrolidyl, (lower alkyl)pyrrolidyl, di(lower alkyl)pyrrolidyl, (lower alkoxy)pyrrolidyl, morpholinyl, (lower alkyl)morpolinyl, di(lower alkyl)morpholinyl, (lower alkoxy)morpholinyl, thiamorpholinyl, (lower alkyl)thiamorpholinyl, di(lower alkyl)thiamorpholinyl, (lower alkoxy)thiamorpholinyl, piperazyl, (lower alkyl)piperazyl, di(lower alkyl)piperazyl, (lower alkoxy)piperazyl, (hydroxy-lower alkyl)piperazyl, (lower alkanoyloxyalkyl)piperazyl, (hydroxy-lower alkoxy-lower alkyl)piperazyl, (carbo-lower alkoxy)-piperazyl and homopiperazino, and R and R' are each selected from the group consisting of hydrogen, halgen, lower alkyl, lower alkoxy, trifluoromethyl, trifluoromethylmercapto, trifluormethoxy and N,N-dimethylaminosulfonyl; and non-toxic acid addition salts thereof.

2. 5-[di(lower alkyl)amino(lower alkyl)]-5,11-dihydrodibenzo[b,e][1,4]thiazepine.

3. A non-toxic acid-addition salt of the compound of claim 2.

4. 5 - (3 - dimethylaminopropyl)-5,11-dihydrodizenzo[b,e][1,4]thiazepine.

5. A compound of the formula

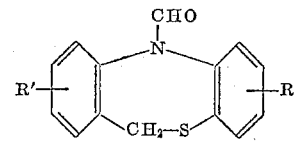

wherein R and R' are each selected from the group consisting of hydrogen, halogen, lower alkyl, lower alkoxy, trifluoromethyl, trifluoromethylmercapto, trifluoromethoxy and N,N-dimethylaminosulfonyl.

6. 5,11 - dihydrodibenzo[b,e][1,4]thiazepine-5-carboxaldehyde.

7. A non-toxic acid-addition salt of 5-(3-dimethylaminopropyl)-5,11-dihydrodibenzo[b,e][1,4]thiazepine.

8. 5 - (3 - dimethylaminopropyl)-5,11-dihydrodibenzo[b,e][1,4]thiazepine hydrochloride.

References Cited by the Examiner

UNITED STATES PATENTS

| | | | |
|---|---|---|---|
| 2,687,414 | 8/54 | Cusic | 260—243 |
| 2,888,459 | 5/59 | Jacob et al. | 260—243 |
| 2,909,521 | 10/59 | Jacob et al. | 260—243 |
| 2,985,653 | 5/61 | Jacob et al. | 260—243 |
| 3,004,028 | 10/61 | Dolliver et al. | 260—243 |
| 3,047,572 | 7/62 | Craig | 260—243 |
| 3,069,432 | 12/62 | Yale et al. | 260—333 |

FOREIGN PATENTS 1,176,115 11/58 France.

OTHER REFERENCES

Conant: The Chem. of Org. Compounds, Macmillan Co., New York (1939), page 264.

WALTER A. MODANCE, *Primary Examiner*.

NICHOLAS S. RIZZO, *Examiner*.